United States Patent [19]

Kingsley

[11] 4,412,698
[45] Nov. 1, 1983

[54] METHOD AND APPARATUS FOR ATTACHING SUN VISOR TO AN AUTOMOBILE

[76] Inventor: Michael C. Kingsley, 2221 Ross Way, Tacoma, Wash. 98421

[21] Appl. No.: 294,042

[22] Filed: Aug. 18, 1981

[51] Int. Cl.³ .............................................. B60J 3/00
[52] U.S. Cl. ............................... 296/97 A; 296/95 R; 403/404; 403/408
[58] Field of Search ......................... 296/97 A, 95 R; 403/408, 404; 411/70, 43, 371; 293/102

[56] References Cited

U.S. PATENT DOCUMENTS 2,777,732  1/1957  Walsh ................................ 296/95 R
3,556,570  1/1971  Cosenza ............................. 403/408

FOREIGN PATENT DOCUMENTS 2936086  3/1980  Fed. Rep. of Germany ...... 293/102

Primary Examiner—Robert R. Song
Attorney, Agent, or Firm—Hughes, Barnard & Cassidy

[57] ABSTRACT

A plurality of fasteners joining a sun visor to an automobile. Each fastener fits through a related pair of matching holes in the visor and automobile body, with the hole in the visor being enlarged to permit lateral movement of the visor relative to the fastener. A washer fits over the fastener and against a flange of the fastener. In the fastening position, the flange presses against the washer which in turn presses against the visor, permitting slide movement therebetween. When there is relative movement between the visor and the automobile body due to expansion and contraction because of temperature change, the fasteners permit relative movement without creating stresses in the visor.

6 Claims, 4 Drawing Figures

U.S. Patent
Nov. 1, 1983
4,412,698
FIG. 1
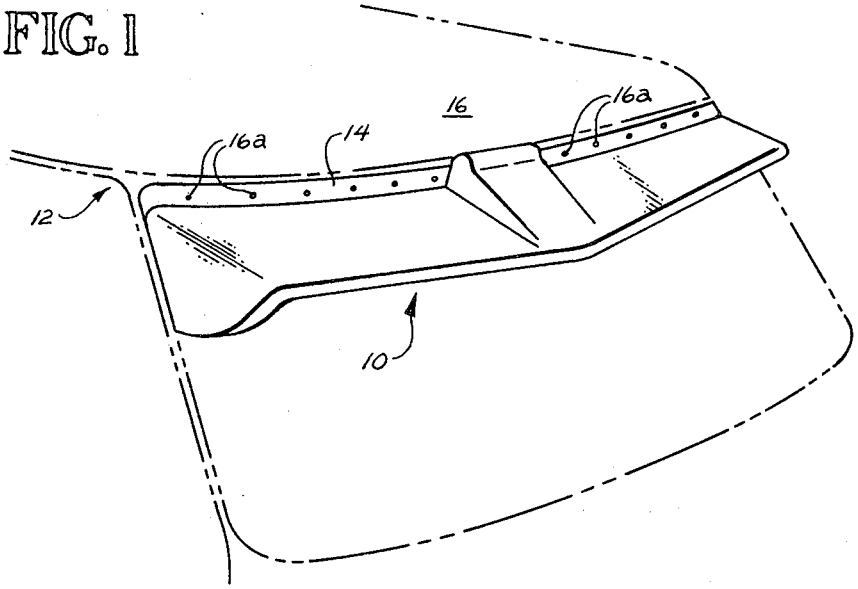
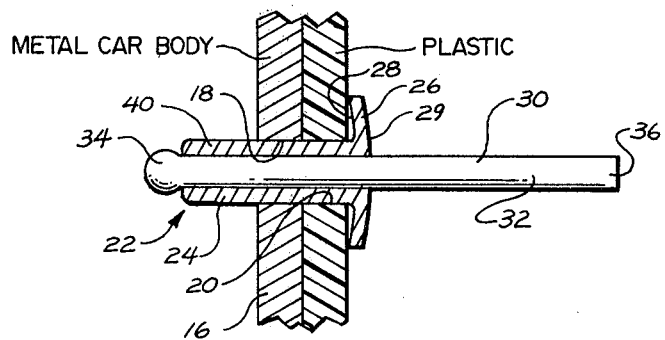
FIG. 2
PRIOR ART
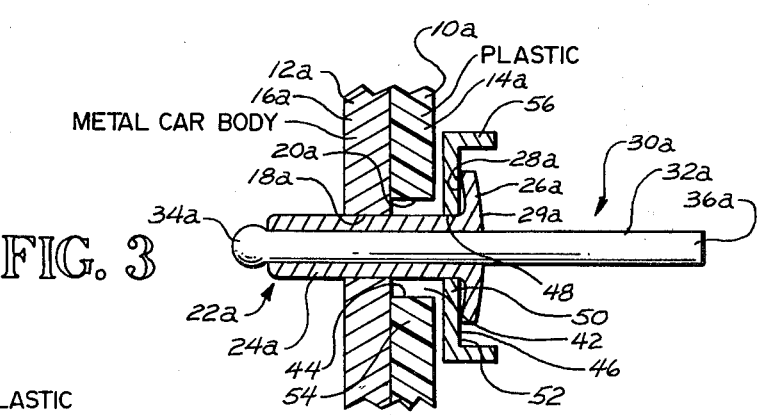
FIG. 3
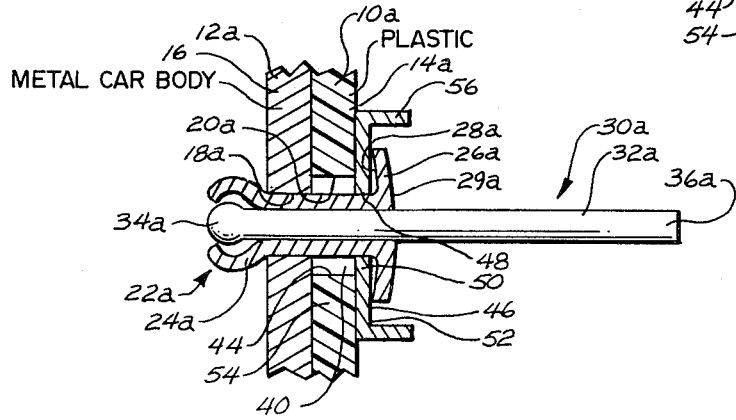
FIG. 4

METHOD AND APPARATUS FOR ATTACHING SUN VISOR TO AN AUTOMOBILE

BACKGROUND OF THE INVENTION

The present invention realtes to a method and apparatus for joining two members together in a manner to permit relative movement therebetween, and more particularly to such a method and apparatus for mounting a sun visor to an automobile body.

For a number of years it has been a common practice to manufacture automobile sun visors from plastic. These visors are mounted to the automobile at the location of the front window, and the visor has an edge portion by which it is attached to the automobile body at spaced locations around the front window. A common method for attaching the visor to the automobile is to drill a plurality of matching holes through the visor and the automobile body at spaced locations along the fastening edge of the sun visor. Blind rivets are placed one in each pair of holes, and the forward or blind side of the rivet is expanded in a conventional manner by withdrawing an interior expanding member of the rivet, while pressing a flange of the rivet against the visor.

One of the problems with fastening the sun visor to the automobile body in this manner is that due to temperature changes, there is expansion and contraction of the plastic visor relative to the metal car body. The resulting stresses sometimes cause cracks to form in the visor. There have been some attempts in the prior art to alleviate this problem by providing certain tolerances in the fit of the fastener relative to the holes in the automobile body and the visor. However, this solution has not been entirely satisfactory since in some instances the rigid fastening of a visor to the automobile body still will sometimes cause cracks in the visor.

A search of the patent literature has disclosed a number of fastening devices, these being listed below.

U.S. Pat. No. 3,930,432 discloses a bolt head having a washer element that fits against the bearing face of the bolt head. The combination of the washer and the cover is to protect the fastening device against corrosion and also to provide a decorative effect. The patent states that this type of fastener can be used to attach the trim to a vehicle.

British Specification No. 890,049 shows a similar arrangement where there is a collar that fits against the head of a screw. The screw is used to fasten a mirror to a wall and the function of the collar is to provide a cushion between the head and the surface of the mirror. This is to avoid the problem of the screw pressing too strongly against the mirror so as to cause cracking thereof.

British Specification No. 1,116,444 shows a fastening device where there is a washer and cap assembly covering the head of a screw. The particular application is to attach corrugated sheeting to the walls and roof of building structures. The cap and washer assembly is to provide resistance against corrosion and to provide a seal against moisture.

U.S. Pat. No. 4,123,630 is representative of a fastening device where there is provided spacing between a shank of some member and the structure to which it is mounted.

In view of the foregoing, it is an object of the present invention to provide a method and apparatus for fastening a sun visor to an automobile, in a manner to alleviate the problem of cracking of the sun visor due to differential expansion and construction of the sun visor relative to the automobile body.

SUMMARY OF THE INVENTION

In the method of the present invention, a first member, such as a visor, is secured to a second member, such as an automobile body, at a fastening location where there is relative movement between the two members. First, there is provided a fastening member having a predetermined diameter, and having a forward end and a rear end with a flange. The first and second members are positioned so as to be joined to one another. These two members are formed with a pair of matching holes in the first and second members. The hole in the first member has a diameter sufficiently greater than the diameter of the fastener to permit relative lateral motion between the fastener and the first member when the fastener is placed in the hole of the first member.

An insert is placed onto the fastener, with the insert having a forward bearing surface to press against the first member and a rear surface to engage the flange. The fastening member with the insert is placed into the two holes. Then the flange is pressed against the insert so that the insert presses against the first member, and the fastener is secured to the second member. In this manner the first and second members are joined to one another, with relative movement between the two members being permitted.

In the preferred form, the fastener is a blind rivet comprising a sleeve that carries that flange, and an expanding member positioned within the sleeve. The expanding member is moved rearwardly to deform the sleeve so that it becomes secured to the second member, while pressing the flange against the insert.

Also, in the preferred form the insert has at its bearing surface a hardness not substantially greater than a hardness of the first member. Thus, the bearing surface is prevented from digging into said first member so as to permit relative slide motion between the insert and the first member.

In the specific application of applying the method of the present invention to a plastic visor that is to be mounted to the automobile, a plurality of fasteners are provided, such as those indicated above. The visor and the automobile body are provided with matching sets of holes, with at least some of the holes in the visor having a diameter greater than that of the sleeve of its related fastener. Each fastener is secured to the body and the visor in the manner described above.

The visor assembly of the present invention comprises a visor and a plurality of fasteners such as those described above. The fasteners are positioned within the sets of matching holes in the visor and the automobile body, and secured as described above. The enlarged holes in the visor and the inserts being positioned between related flanges and the visor permits the relative movement between the visor and the automobile body due to expansion and contraction because of temperature changes.

BRIEF DESCRIPTION OF THE DRAWING

FIG. 1 is an isometric view showing a typical plastic sun visor mounted to an automobile;

FIG. 2 is a sectional view through a portion of the sun visor and automobile, showing a typical prior art method of fastening the visor to the automobile by means of a blind rivet;

FIG. 3 is a sectional view similar to FIG. 1, showing the fastening device of the present invention placed in a pair of matching holes prior to fixing the fastener in its fastening position; and FIG. 4 is a view similar to FIG. 3, showing the fastener in its fixed fastening position.

DESCRIPTION OF THE PREFERRED EMBODIMENT

In FIG. 1, there is shown a typical plastic visor 10, mounted to an automobile 12. The visor 10 has along its upper and side edges a peripheral edge portion 14 which fits against the skin 16 of the automobile 12. The visor 10 is fixedly attached to the automobile 12 by inserting fasteners through the peripheral edge portion 14 and the skin 16 at spaced locations 16a along the peripheral edge portion 14 of the visor 10.

FIG. 2 shows a typical prior art method of fastening the visor 10 to the automobile 12. At each fastening location there are drilled two matching holes 18 and 20 in the skin 16 and visor edge portion 14, respectively. Then a rivet assembly 22 is inserted in the two holes 18 and 20.

The rivet assembly 22 comprises a sleeve portion 24 having fixedly attached thereto at its back side an annular flnage 26 having a forward bearing surface 28 and a rear face 29. Positioned within the sleeve portion 24 is an expanding member 30 having an elongate rod portion 32 with an expansion head 34 at the forward end of the rod portion 32. The rear end 36 of the rod portion 32 extends beyond the flange 26. The expanding member 30 is retracted to cause the head 34 to deform the forward end 40 of the sleeve 24 to secure the rivet assembly to the members 14 and 16.

As indicated previously, when there is differential expansion and contraction between the visor 10 and the automobile 12, the edge portion 14 of the visor 10 tends to shift laterally relative to the skin 16. If this lateral shifting is sufficiently severe, cracks can occur in the plastic visor 10. It is to this problem that the present invention is directed.

The method and apparatus of the present invention will now be described with reference to FIGS. 3 and 4. Those components of the present invention which are substantially similar to components of the prior art fastener of FIG. 2 will be given like numerical designations, with an "a" suffix distinguishing those of the present invention.

In FIGS. 3 and 4, there are shown the peripheral portion 14a of the visor 10a and the skin 16a of the automobile 12a. The rivet assembly 22a is substantially the same as in the prior art, comprising a sleeve portion 24a with a flange 26a having a forward bearing surface 28a and the rear face 29a. Also, there is the expanding member 30a having the rod portion 32a with a rear end 36a and an expansion head 34a.

As in the prior art method of fastening, two holes 18a and 20a are formed in the skin 16a and the visor edge portion 14a. However, the hole 10a is formed to an enlarged diameter greater than that of the sleeve portion 24a, to leave an annular gap 42 between the sleeve portion 24 and the cylindrical side surface 44 defining the hole 20. Prior to inserting the rivet assembly 22a through the two holes 18a and 20a, a plastic insert 46 is placed around the sleeve portion 24a. This insert 46 has a center opening 48 slightly larger than the diameter of the sleeve portion 24a and has a generally flat circular configuration. The insert 46 has an inner portion 50 which is immediately adjacent the annular gap 42 and an outer portion 52 that presses against that portion 54 of the visor 10a that surrounds the hole 20a. As shown herein, at the edge of the insert 46 there is a cylindrical flange 56. If desired, this flange 56 can be used to receive a closure cap that is fitted around the flange 56 to completely conceal the rear poriton of the rivet assembly 22a.

To describe the operation of the present invention, first the two holes 18a and 20a are formed in, respectively, the peripheral edge portion 14a of the visor 10a and the skin 16a of the automobile 12a. As indicated earlier, the hole 20a is made to a larger diameter. The insert 46 is placed over the sleeve portion 24a, and the rivet assembly 22a is inserted into the two holes 18a and 20a, so that the insert 46 is positioned against the visor edge portion 54 surrounding the hole 20a. Then in a conventional manner, the rivet assembly 22a is deformed by pulling the rod portion 32a rearwardly so that the expansion head 34a moves into the sleeve portion 24a and deforms the forward end 40a, as shown in FIG. 4. Then the rear portion of the rod 34a is broken off with the remaining part of the rivet assembly 22a being fixed in its fastening position.

In the position of FIG. 4, it can be seen that the flange 26a presses against the plastic insert 46 which in turn presses against the plastic sun visor 10a. The insert 46 has a hardness that is substantially less than the metal flange 26a and approximately the same or possibly less than the hardness of the material of the visor 10a. Thus, any tendency for the flange 26a to "dig into" the adjoining material is cushioned by the insert 46. The insert 46 in turn presses against the visor portion 14a in a flat planar relationship so that the visor portion 14a is able to shift laterally relative to the sleeve portion 24a and the insert 46. Therefore, when there is expansion and contraction of the visor 10a relative to tha automobile skin 16a, the rivet assembly 22a permits relative lateral movement, while still bolding the visor 10a securely to the automobile 12a.

What is claimed is:

1. A method of joining a visor to an automobile structure at a fastening location where there is relative movement between the two members, said visor being made of a more yielding material, such as plastic, said method comprising:
   a. providing a fastening member comprising a sleeve having a forward deformable end portion and a rear portion with a flange having a forward bearing surface, and an elongate expanding member positioned within the sleeve and having a forward expanding head, said sleeve having a predetermined diameter,
   b. positioning said visor at a position to be joined to said structure,
   c. forming a pair of matching holes in said visor and said structure, with the hole in the visor having a diameter sufficiently greater than the diameter of the sleeve to permit relative lateral motion between the fastener and the visor when the fastener is placed in the hole of the visor,
   d. placing an insert onto said fastener, said insert having a forward bearing surface to press against the visor and a rear surface to engage said flange,
   e. inserting the fastening member into the two holes,
   f. moving said expanding member in a rearward direction with a force sufficient to deform the forward end portion of the sleeve, and pressing said flange against said insert so that the insert presses against the first member, thus securing the visor to the automobile structure, with the relative movement between the visor and the structure being permitted.

2. The method as recited in claim 1, wherein said insert has at its bearing surface a hardness not substantially greater than a hardness of the visor, whereby said bearing surface is prevented from digging into said visor so as to permit relative slide motion between said insert and said first member.

3. A method of mounting a plastic visor to an automobile body, where there is relative movement between the visor and the body due to expansion and contraction because of temperature changes, said method comprising:
 a. providing a plurality of fasteners, each fastener comprising a sleeve member having a predetermined outside diameter and forward deformable end portion, and having at its rear end an outwardly extending flange, and an expanding member mounted within said sleeve member and having a forward expanding head,
 b. providing the visor and the body with matching holes, with at least some of the holes in the visor having a diameter greater than that of the sleeve of its related fastener, so that relative lateral motion is permitted between said sleeve and the hole in the visor when the sleeve is positioned in the hole,
 c. positioning the visor against the body so that corresponding holes in the visor and body are in alignment,
 d. placing inserts onto sleeves of at least some of the fasteners, each insert having a diameter greater than the diameter of its related hole in the visor, each insert having a forward bearing face to press against the visor and a rear face to engage the flange of its related sleeve,
 e. inserting the fasteners in related pairs of holes in the visor and the automobile,
 f. pressing the flange of each fastener having an insert against the insert so that the insert presses against the visor, and retracting the expanding member to expand the forward end of the related sleeve to engage the automobile body in fastening engagement, whereby the fasteners are secured to the automobile body and firmly engage the visor to hold the visor to the automobile body, while the enlarged diameters of the holes in the visor and the inserts pressing against the visor permit relative lateral motion between the visor and the body.

4. The method as recited in claim 3, wherein each insert comprises a generally planar member having a center through hole to accommodate the sleeve of its related fastener, said insert having a hardness less than its related flange and not substantially greater than hardness of the visor, whereby any tendency of the flange to dig into adjacent material is absorbed by the insert, while permitting relative slide motion between the insert and the visor.

5. A visor assembly for an automobile, said visor assembly comprising:
 a. a visor adapted to be mounted to an automobile body, said visor having a plurality of through fastening holes,
 b. a plurality of fasteners, each fastener comprising a sleeve with a flange, and an expanding member positioned within said sleeve, each sleeve having a predetermined diameter less than the diameter of a corresponding hole in the visor, so that with the sleeve in its related hole, relative lateral motion is permitted between the sleeve and the visor,
 c. each sleeve being positioned within its related hole in the visor and also in a matching hole in the car body, with each sleeve engaging the automobile body in fastening relationship,
 d. an insert positioned around at least some of said sleeves and positioned between its related flange and the visor, each such insert having a bearing surface to engage the visor and a second face engaging its related flange, said insert being movable relative to said visor whereby the sleeves of te fasteners securely hold the visor to the automobile body, while the enlarged diameter of the visor holes and the inserts between the flanges and the visor permit relative lateral movement between the visor and the sleeves.

6. The assembly as recited in claim 5, wherein the inserts have a hardness not substantially greater than that of the visor, to alleviate any tendency for the insert to dig into the visor, so as to permit slide movement between the inserts and the visor.

* * * * *